US009298398B2

(12) United States Patent
Chambliss et al.

(10) Patent No.: US 9,298,398 B2
(45) Date of Patent: Mar. 29, 2016

(54) FINE-GRAINED CONTROL OF DATA PLACEMENT

(71) Applicant: INTERNATIONAL BUSINESS MACHINES CORPORATION, Armonk, NY (US)

(72) Inventors: David D. Chambliss, Morgan Hill, CA (US); Ehood Garmiza, Neve Ziv (IL); Leah Shalev, Zichron-Yaakov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 465 days.

(21) Appl. No.: 13/863,755

(22) Filed: Apr. 16, 2013

(65) Prior Publication Data

US 2014/0310456 A1    Oct. 16, 2014

(51) Int. Cl.
*G06F 12/00* (2006.01)
*G06F 3/06* (2006.01)

(52) U.S. Cl.
CPC .............. *G06F 3/0689* (2013.01); *G06F 3/061* (2013.01); *G06F 3/0614* (2013.01); *G06F 3/0649* (2013.01)

(58) Field of Classification Search
CPC .................................. G06F 3/06; G06F 12/00
USPC .................................. 711/100, 114, 154, 200
See application file for complete search history.

(56) References Cited

U.S. PATENT DOCUMENTS

| 5,636,359 | A | 6/1997 | Beardsley et al. |
|---|---|---|---|
| 5,724,501 | A | 3/1998 | Dewey et al. |
| 5,784,548 | A | 7/1998 | Liong |
| 5,809,320 | A | 9/1998 | Jain et al. |
| 5,933,860 | A | 8/1999 | Emer et al. |
| 5,960,169 | A * | 9/1999 | Styczinski ........... G06F 11/1076 711/114 |
| 6,012,123 | A | 1/2000 | Pecone et al. |
| 6,038,641 | A | 3/2000 | Zangenehpour |
| 6,101,615 | A | 8/2000 | Lyons |
| 6,243,795 | B1 | 6/2001 | Yang et al. |
| 6,505,216 | B1 | 1/2003 | Schutzman et al. |
| 6,529,995 | B1 * | 3/2003 | Shepherd ............ G06F 11/1435 707/999.202 |
| 6,714,789 | B1 | 3/2004 | Oh et al. |

(Continued)

FOREIGN PATENT DOCUMENTS

| CN | 1664793 A | 9/2005 |
|---|---|---|
| CN | 101997918 A | 3/2011 |

(Continued)

OTHER PUBLICATIONS

Ripberger et al., "IBM System Storage DS8000 Storage Virtualization Overview," IBM, Apr. 13, 2010.

(Continued)

*Primary Examiner* — Tuan Thai
(74) *Attorney, Agent, or Firm* — Griffiths & Seaton PLLC (57) ABSTRACT

Methods, apparatus and computer program products implement embodiments of the present invention that include defining, in a storage system including multiple storage devices, multiple redundant array of independent disks (RAID) configurations for data stored on the storage devices. A first one of the multiple RAID configurations is assigned to a first entry in a partition table having multiple entries, and a second one of the multiple RAID configurations is assigned to a second entry in the partition table, the second one of the multiple RAID configurations independent from the first one of the multiple RAID configurations.

12 Claims, 7 Drawing Sheets

(56) References Cited

U.S. PATENT DOCUMENTS

| | | | |
|---|---|---|---|
| 6,775,738 B2 | 8/2004 | Ash et al. | |
| 7,593,974 B2 | 9/2009 | Suzuki et al. | |
| 7,657,509 B2 | 2/2010 | Clark et al. | |
| 7,849,356 B2 | 12/2010 | Jones et al. | |
| 7,945,732 B2 | 5/2011 | Koseki | |
| 7,987,158 B2 | 7/2011 | Boyd et al. | |
| 8,103,904 B2 | 1/2012 | Hafner et al. | |
| 8,112,395 B2 | 2/2012 | Patel et al. | |
| 8,156,368 B2 | 4/2012 | Chambliss et al. | |
| 8,494,063 B1 | 7/2013 | Reudink et al. | |
| 9,104,599 B2 | 8/2015 | Atkisson et al. | |
| 9,146,695 B2 | 9/2015 | Galloway et al. | |
| 2002/0091897 A1 | 7/2002 | Chiu et al. | |
| 2002/0170017 A1 | 11/2002 | Busser | |
| 2003/0204690 A1 | 10/2003 | Yamada et al. | |
| 2004/0093464 A1 | 5/2004 | Hassner et al. | |
| 2004/0128269 A1 | 7/2004 | Milligan et al. | |
| 2004/0139365 A1 | 7/2004 | Hosoya | |
| 2005/0015436 A1 | 1/2005 | Singh et al. | |
| 2005/0055630 A1* | 3/2005 | Scanlan | G06F 17/289 715/234 |
| 2005/0289296 A1* | 12/2005 | Balasubramanian | G06F 3/06051 711/114 |
| 2006/0123270 A1 | 6/2006 | Forhan et al. | |
| 2006/0294301 A1 | 12/2006 | Zohar et al. | |
| 2007/0016754 A1* | 1/2007 | Testardi | G06F 3/0611 711/206 |
| 2007/0028145 A1 | 2/2007 | Gerhard et al. | |
| 2007/0067667 A1 | 3/2007 | Ikeuchi et al. | |
| 2007/0079083 A1 | 4/2007 | Gladwin et al. | |
| 2008/0040553 A1 | 2/2008 | Ash et al. | |
| 2008/0195807 A1 | 8/2008 | Kubo et al. | |
| 2008/0201608 A1 | 8/2008 | Forhan et al. | |
| 2008/0263274 A1 | 10/2008 | Kishi et al. | |
| 2009/0049050 A1 | 2/2009 | Whitehead | |
| 2009/0089612 A1 | 4/2009 | Mathew et al. | |
| 2009/0216832 A1* | 8/2009 | Quinn | G06F 11/1076 709/203 |
| 2010/0199125 A1* | 8/2010 | Reche | G06F 11/108 714/6.22 |
| 2011/0153606 A1 | 6/2011 | Kim et al. | |
| 2011/0161299 A1 | 6/2011 | Prahlad et al. | |
| 2011/0202792 A1 | 8/2011 | Atzmony | |
| 2011/0208919 A1 | 8/2011 | Pruthi | |
| 2011/0208922 A1* | 8/2011 | Coronado | G06F 11/1438 711/148 |
| 2011/0208943 A1 | 8/2011 | Schott | |
| 2011/0225453 A1 | 9/2011 | Spry et al. | |
| 2011/0258391 A1 | 10/2011 | Atkisson et al. | |
| 2011/0282835 A1 | 11/2011 | Cannon et al. | |
| 2012/0110257 A1 | 5/2012 | Enohara et al. | |
| 2012/0210060 A1* | 8/2012 | Acuna | G06F 3/0605 711/114 |
| 2013/0024627 A1 | 1/2013 | Benhase et al. | |
| 2014/0019421 A1 | 1/2014 | Jagadeesan | |
| 2014/0310244 A1 | 10/2014 | Chambliss et al. | |
| 2014/0310457 A1 | 10/2014 | Chambliss et al. | |
| 2014/0310464 A1 | 10/2014 | Chambliss et al. | |
| 2014/0310465 A1 | 10/2014 | Chambliss et al. | |
| 2014/0310489 A1 | 10/2014 | Chambliss et al. | |
| 2014/0310557 A1 | 10/2014 | Chambliss et al. | |
| 2015/0268883 A1 | 9/2015 | Chambliss et al. | |
| 2015/0268884 A1 | 9/2015 | Chambliss et al. | |
| 2015/0269026 A1 | 9/2015 | Chambliss et al. | |

FOREIGN PATENT DOCUMENTS

| | | |
|---|---|---|
| CN | 102185929 A | 9/2011 |
| WO | 2014170791 A3 | 10/2014 |

OTHER PUBLICATIONS

Rodeh, "B-trees, Shadowing and Clones," ACM Transactions on Computational Logic, vol. V, No. N, IBM, Aug. 2007.

Sivathanu, et al., Improving Storage System Availability with D-GRAID, ACM Transactions on Storage, vol. 1, No. 2, May, 2005. http://pages.cs.wisc.edu/~muthian/dgraid-tos.pdf.

* cited by examiner

FINE-GRAINED CONTROL OF DATA PLACEMENT

FIELD OF THE INVENTION

The present invention relates generally to data storage, and specifically to fined-grained control of data placement by using multiple coexisting disk distribution tables.

BACKGROUND

Data storage tiering (also referred to herein as data tiering) is a technique used to improve performance in storage systems comprising multiple tiers of storage devices. In data tiering, the storage devices can be assigned to different tiers based on performance of the storage devices (e.g., faster storage devices can be assigned to a first tier and slower devices can be assigned to a second tier).

Typically, frequently used data is migrated to tiers comprising faster storage devices, and infrequently used data is migrated to tiers comprising slower storage devices. Examples of storage devices for faster storage tiers include solid state disks (SSDs), faster (e.g., 15,000 revolutions per minute) rotating disks such as Serial Attached Small Computer System Interface (SAS) and Fibre Channel (FC) drives, and outer tracks of a rotating disk (On a rotating disk, the outer tracks of the disk typically access data faster than the inner tracks of the disk.) Examples of storage devices for slower storage tiers include slower (e.g., 7,200 revolutions per minute) rotating disks such as SATA drives, and the inner tracks of rotating disks.

Migrating frequently used data files to faster storage tiers can help reduce input/output (I/O) bottlenecks that may occur due to contention (e.g., for the data file, the storage device, or an I/O bus coupled to the storage device). Likewise, migrating less frequently used data files to slower tiers may not significantly impact performance, since there is typically no simultaneous contention for the file. Therefore, data tiering can help increase the performance of storage systems, while having a minimal cost impact.

The description above is presented as a general overview of related art in this field and should not be construed as an admission that any of the information it contains constitutes prior art against the present patent application.

SUMMARY

There is provided, in accordance with an embodiment of the present invention a method, including defining, in a storage system including multiple storage devices, multiple redundant array of independent disks (RAID) configurations for data stored on the storage devices, assigning, to a first entry in a partition table having multiple entries, a first one of the multiple RAID configurations, and assigning, to a second entry in the partition table, a second one of the multiple RAID configurations that is independent from the first one of the multiple RAID configurations.

There is also provided, in accordance with an embodiment of the present invention a storage system, including multiple storage devices, and a processor configured to define multiple redundant array of independent disks (RAID) configurations for data stored on the storage devices, to assign, to a first entry in a partition table having multiple entries, a first one of the multiple RAID configurations, and to assign, to a second entry in the partition table, a second one of the multiple RAID configurations that is independent from the first one of the multiple RAID configurations.

There is further provided, in accordance with an embodiment of the present invention a computer program product, the computer program product including a non-transitory computer readable storage medium having computer readable program code embodied therewith, the computer readable program code including computer readable program code configured to define, in a storage system including multiple storage devices, multiple redundant array of independent disks (RAID) configurations for data stored on the storage devices, computer readable program code configured to assign, to a first entry in a partition table having multiple entries, a first one of the multiple RAID configurations, and computer readable program code configured to assign, to a second entry in the partition table, a second one of the multiple RAID configurations that is independent from the first one of the multiple RAID configurations.

BRIEF DESCRIPTION OF THE DRAWINGS

The disclosure is herein described, by way of example only, with reference to the accompanying drawings, wherein.

DETAILED DESCRIPTION OF EMBODIMENTS

In computer storage systems (also referred to herein as storage subsystems), logical volume management may be used to manage physical storage devices such as hard disk drives and solid state drives. In logical volume management, a single storage device can be divided into multiple logical storage units, thereby treating a single physical storage device as multiple storage devices. Additionally, a volume manager can concatenate, stripe together or otherwise combine regions (a region, also referred to herein as a partition, is a sequence of bytes having a specific length, typically one megabyte) into larger virtual ones (i.e., regions) that can be re-sized or moved, potentially without interrupting system use.

To manage a given volume, a partition table can be utilized to define the relationship between a logical address of a logical volume and physical locations on the physical storage device. Upon receiving a request to perform an input/output (I/O) operation at a specific logical address on the given volume, a storage system can utilize the partition table identify a physical location on a storage device that corresponds to the specific logical address.

Embodiments of the present invention provide methods and systems for fine-grained control over data placement in logical volumes of a storage system. In some embodiments, multiple data placement schemes can be defined for the logical volumes on the storage system. The logical volumes may be defined as a set of slices, with each slice having an associated partition table that references locations on the storage devices. As explained hereinbelow, embodiments of the present invention enable data placement schemes to be assigned at the region level. In other words, a given slice (and therefore, a volume) may have multiple data placement schemes.

The multiple data placement schemes may comprise different redundant array of independent disks (RAID) levels (e.g., RAID 1, RAID 1+0, and RAID 6 with various numbers of data and parity disks) and different types of storage devices (e.g., low capacity solid state drives and high capacity serial AT attachment drives). For example, data that is not accessed and/or updated frequently may be stored on larger and slower (and less expensive) storage devices. In some embodiments, there can be identical RAID configurations (e.g., RAID 6 2+2), with each of the configurations using different types of storage devices.

Fine grained control of the multiple data placement schemes at the region level can enable a storage system to migrate a given region from an existing placement scheme to a new placement scheme without affecting any other region in the same slice or volume. Therefore, embodiments of the present invention enable I/O load balancing and resiliency at the region level.

Figure 1:
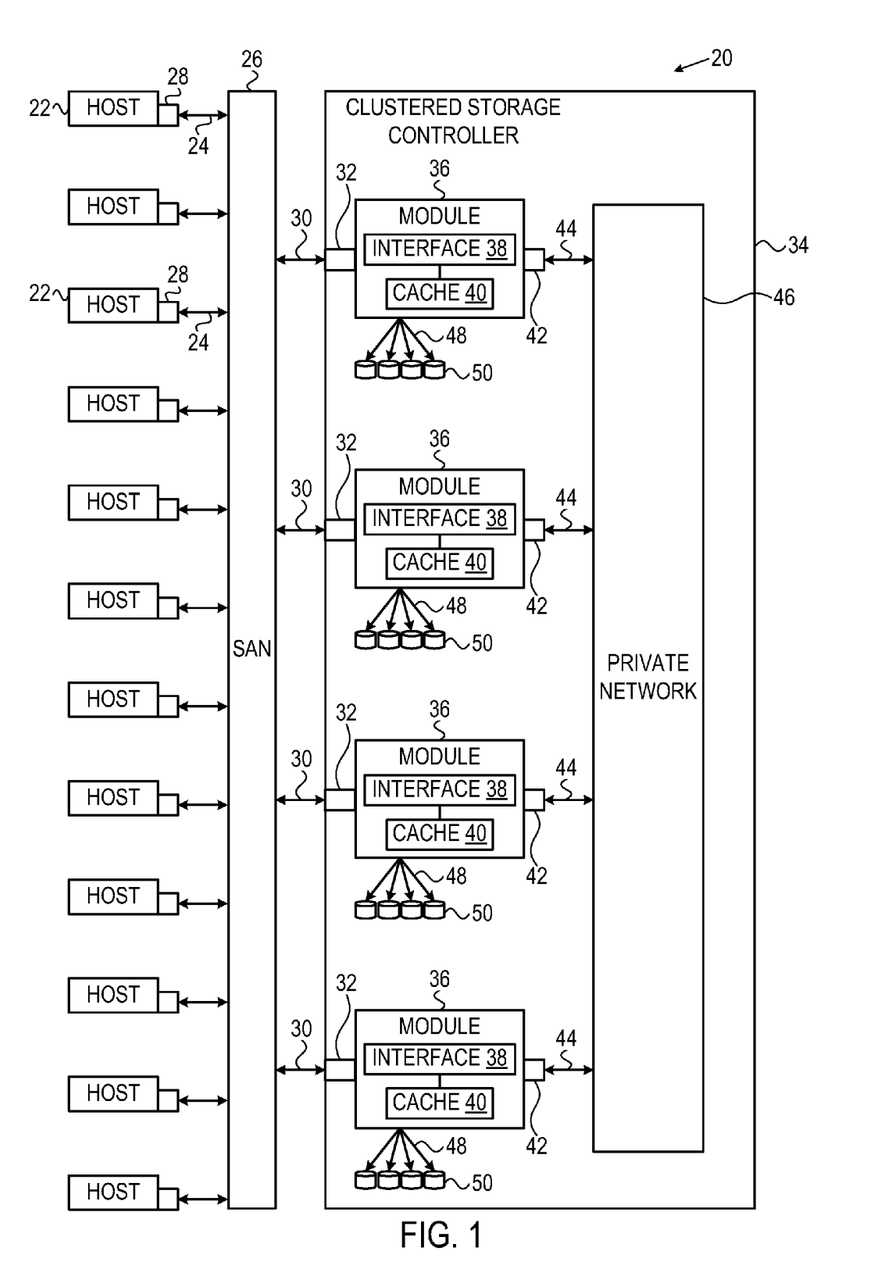
FIG. 1 is a block diagram that schematically illustrates a storage system, in accordance with an embodiment of the present invention.

FIG. 1 is a block diagram that schematically illustrates a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

While the configuration of storage subsystem 20 in FIG. 1 shows each module 36 comprising an adapter 32 that is configured to communicate with SAN 26, other configurations of the storage subsystem are considered to be within the spirit and scope of the present invention. For example, in an alternative configuration, adapter 32 is included in a subset of modules 36.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

While the configuration of storage subsystem 20 shown in Figure has the storage subsystem storing data to physical storage devices 50, other storage apparatuses are considered to be within the spirit and scope of the present invention. For example, storage subsystem 20 may store data to one or more data clouds or storage virtualization devices (SVD).

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

In operation, storage system 20 may store a given set of data in a storage management unit (SMU). Examples of storage management units include but are not limited to logical volumes, storage pools and slices. In the embodiments described herein, a slice comprises a set of partitions on a given storage device 50, and a logical volume may comprise multiple slices distributed among the multiple storage devices.

Figure 2:
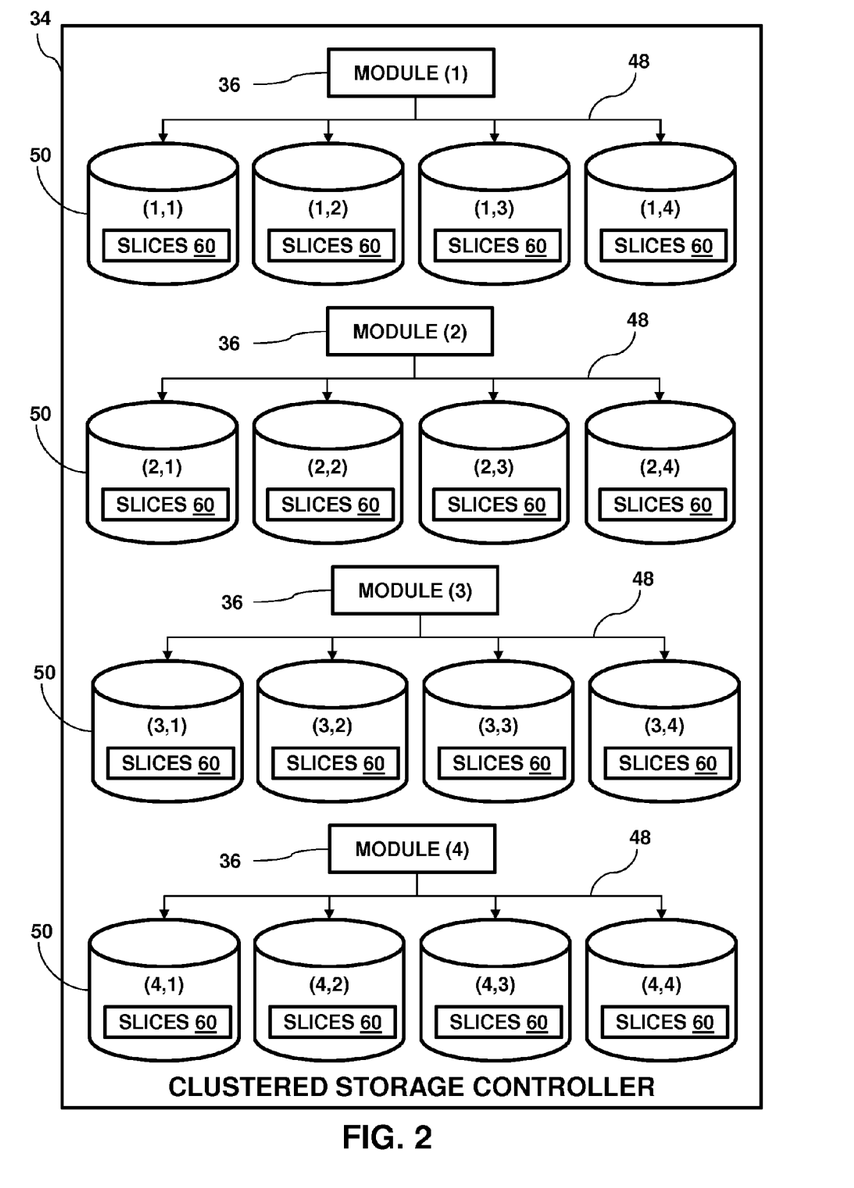
FIG. 2 is a block diagram that schematically illustrates an example of storage management units stored on a storage system, in accordance with an embodiment of the present invention.

FIG. 2 is a block diagram that schematically illustrates an example of storage management units (SMU) configured as slices 60 stored on storage devices 50 of clustered storage controller 34 (also referred to herein as a storage system), in accordance with an embodiment of the present invention. While the embodiments herein describe distributing metadata storage for slices 60, distributing metadata storage for other types of storage management units is considered to be within the spirit and scope of the present invention. For example, the embodiments described herein can be used to distribute metadata for other types of storage management units such as logical volumes and storage pools.

Additionally, in the embodiments described herein, each module 36 may be referenced by an identifier (A), where A is an integer representing a given module 36. As shown in FIG. 2, there are four modules 36 that may be referenced as module 36(1), module 36(2), module 36(3) and module 36(4).

Furthermore, each storage device 50 may be referenced by an ordered pair (A, B), where A is defined above, and where B is a number representing a given storage device 50 coupled to the given module via data connection 48. For example, storage devices 50(3,1), 50(3,2), 50(3,3) and 50(3,4) are coupled to module 36(3) via data connection 48.

Figure 3A:
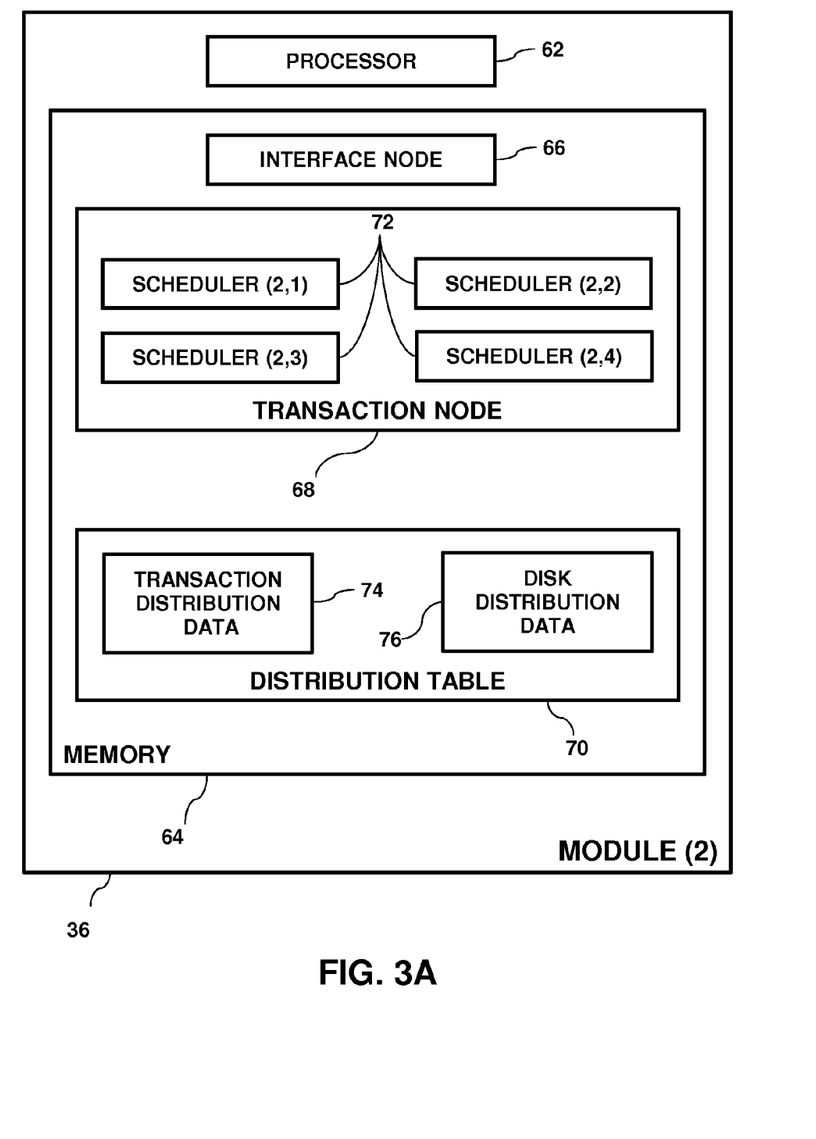
FIGS. 3A-3D, referred to collectively as FIG. 3, are block diagrams that schematically show functional elements of a module of the storage system, in accordance with an embodiment of the present invention.

FIG. 3A is a block diagram that schematically illustrates functional elements of module 36, in accordance with an embodiment of the present invention. Module 36 comprises a processor 62 and a memory 64. For a given module 36 configured to include adapter 32, memory 64 comprises an interface node 66 (i.e., not all memories 36 in storage system 20 include the interface node). Memory 36 also comprises a transaction node 68 and a distribution table 70. In operation, processor 62 executes interface node 66 and transaction node 68 from memory 64.

Processor 62 typically comprises a general-purpose computer, which is programmed in software to carry out the functions described herein. The software may be downloaded to processor 62 in electronic form, over a network, for example, or it may be provided on non-transitory tangible media, such as optical, magnetic or electronic memory media. Alternatively, some or all of the functions of processor 62 may be carried out by dedicated or programmable digital hardware components, or using a combination of hardware and software elements.

Interface node 66 comprises a software application that is configured to receive I/O requests from a given host computer 22, and to convey the I/O request to a given transaction node 68. Additionally, upon the given transaction node completing the I/O request, interface node 66 conveys a result of the I/O request to the given host computer. For example, if the I/O request comprises a write operation, then the conveyed result may comprise an acknowledgement of the write. Alternatively, if the I/O request comprises a read operation, then the conveyed result may comprise data retrieved from storage devices 50.

Transaction node 68 comprises a software application that processes I/O requests via multiple schedulers 72, which manage a set of slices 60. While the configuration of transaction node 68 shown in FIG. 3A comprises four schedulers 72, any number of schedulers is considered to be within the spirit and scope of the present invention. In some embodiments, processor 62 may execute each scheduler 72 on a separate thread (also known as a logical core) of the processor.

In embodiments described herein, each scheduler 72 may be referenced by an ordered pair (A, C), where A is defined above, and C is a number representing a given scheduler 72 executing within the given module. In the example shown in FIG. 3A, the first scheduler 72 in module 36(2) may be referred to herein as scheduler 72(2,1), the second scheduler 72 in module 36(2) may be referred to herein as scheduler 72(2,2), the third scheduler 72 in module 36(2) may be referred to herein as scheduler 72(2,3), and the fourth scheduler 72 in module 36(2) may be referred to herein as scheduler 72(2,4).

As described supra, storage controller 34 may configure a logical volume as a set of slices 60, wherein each of the slices comprises a set of regions on a given storage device 50. For example, a given logical volume may comprise four slices 60 spread over storage devices 50(1,2), 50(2,3), 50(3,4) and 50(4,2). There may be instances where a given storage device 50 stores more than one slice for a given logical volume. Additionally, as described in detail hereinbelow, processor 62 may store multiple copies of a given slice. For example, processor 62 may store a first copy of a given slice 60 on a first storage device 50 (also referred to herein as the primary storage device for the given slice), and an additional copy of the given slice on a second storage device 50 (also referred to herein as the secondary storage device for the given slice).

In embodiments of the present invention, each slice 60 can be associated with a first scheduler 72 that can be configured as a master scheduler, and one or more additional schedulers 72 that can be configured as backup schedulers. Differences between the master and the backup schedulers are described hereinbelow. In the event of a failure of the master scheduler, processor 62 can reconfigure one of the backup schedulers to function as the master scheduler, thereby ensuring the continuous availability of data stored in storage controller 34.

As described supra, processor 62 may store part of a first copy of a given slice 60 on a first data storage device 50, and the reminder of a first copy on a second data storage device 50, and parity data derived from the slice 60 on one or more parity storage devices 50. In the event of a failure of one of the data or parity storage devices, processor 62 can reconstruct the data that had been stored on the failed device from the data that can be read from the surviving devices. If more than one parity storage device is used according to a RAID-6 scheme then data recovery can be performed after failure of more than one of the storage devices. The data recovery ensures the continuous availability of data stored in storage controller 34.

Processor 62 can store associations between the slices, the schedulers and the storage devices to distribution table 70.

Distribution table 70 comprises transaction distribution data 74 and disk distribution data 76. Transaction distribution data 74 can be configured to store associations between the slices and the schedulers, and disk distribution data 76 can be configured to store associations between the slices and the storage devices.

Figure 3B:
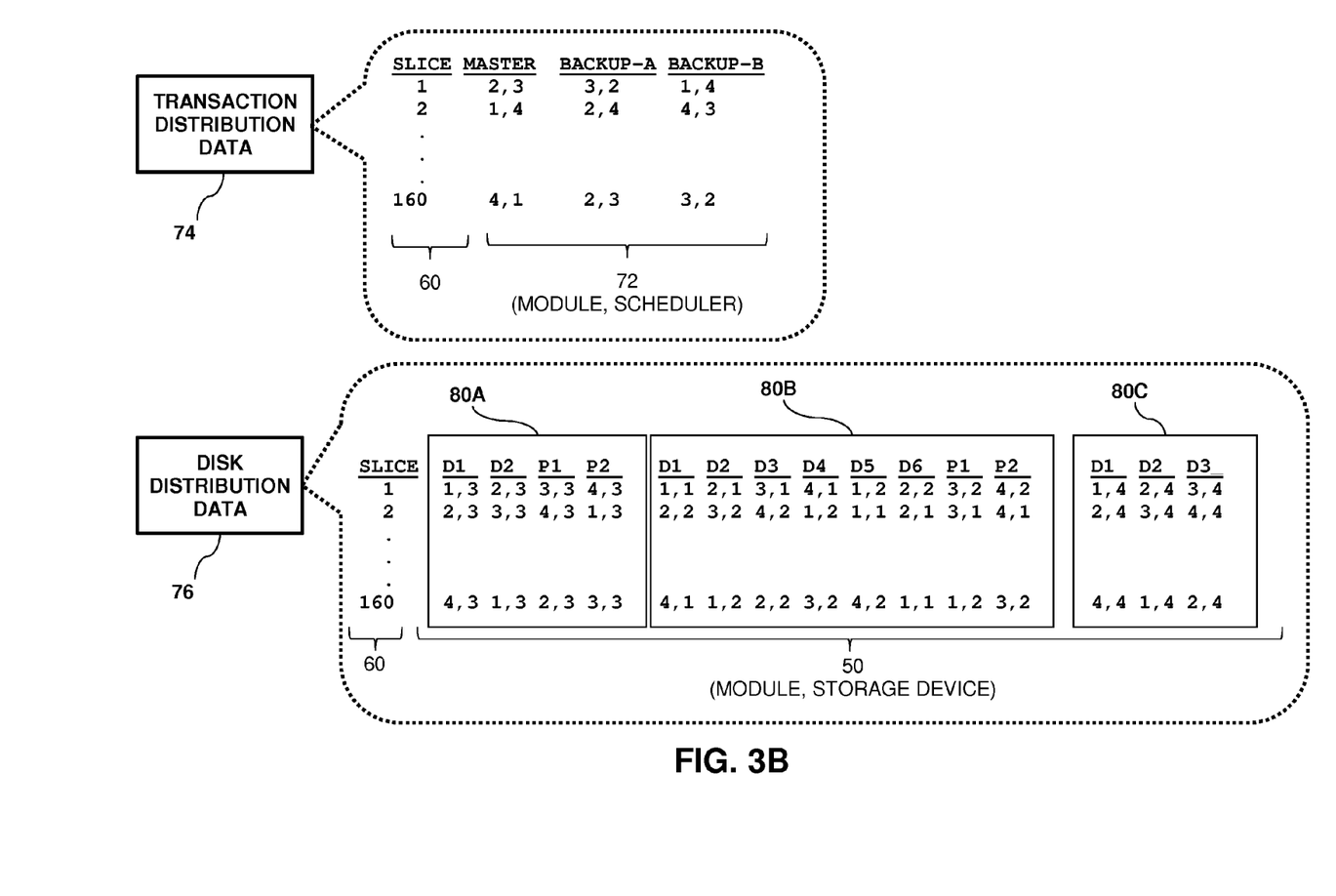

FIG. 3B is a block diagram that schematically illustrates example entries in transaction distribution data 74 and disk distribution data 76, in accordance with an embodiment of the present invention. In the embodiments described herein, each slice may be referenced by an identifier (D), where D is a number representing a given slice 60. In the configuration shown in FIGS. 3B-3C, storage controller 34 comprises 160 slices 60 that can be referenced as slice 60(1)-slice 60(160). Identifier D is also referred to herein as a slice number, so that each slice 60 has an associated slice number, and in the example D is an integer between 1 and 160.

In the configuration shown in FIG. 3B, each slice 60 is associated with a master and two backup schedulers 72, and a primary and a secondary storage device 50. As shown in transaction distribution data 74, scheduler 72(2,3) is configured as the master scheduler and schedulers 72(3,2) and 72(1, 4) are configured as the backup schedulers (i.e., BACKUP-A and BACKUP-B as shown the figure) for slice 160(1).

Disk distribution data 76 comprises disk distribution tables 80A, 80B and 80C, referred to collectively as disk distribution tables 80. Each disk distribution table 80 defines a RAID configuration by assigning a given storage device 50 to each data region and parity region of each slice 60. In the example shown in FIG. 3B:

Disk distribution table 80A defines the storage device distribution for a RAID 6 2+2 configuration, having data regions D1, D2 and parity regions P1, P2.

Disk distribution table 80B defines the storage device distribution for a RAID 6 6+2 configuration having data regions D1-D6 and parity regions P1, P2.

Disk distribution table 80C defines the storage device distribution for a RAID 1 configuration, where each primary data region D1 is mirrored to secondary data regions D2 and D3 (i.e., each primary data region has two mirrored secondary partitions).

Each entry in disk distribution tables 80 comprises an ordered pair (A, B) that references a storage device 50 that is configured to store a given data region or a given parity region for the defined RAID configuration.

In some embodiments, the different RAID configurations in disk distribution tables 80 can be defined based on capacity and performance of the storage devices included in the given RAID configuration. For example:

The storage devices storing data in a RAID 6+2 configuration (i.e., storage devices 50(1,2), 50(1,3), 50(2,2), 50(2,3), 50(3,2), 50(3,3), 50(4,2) and 50(4,3), as shown in disk distribution table 80B) may comprise high capacity (e.g., four terabytes), low performance (e.g., 7,200 revolutions per minute) hard drives.

The storage devices storing data in a RAID 6 2+2 configuration (i.e., storage devices 50(1,1), 50(2,1), 50(3,1) and 50 (4,1), as shown in disk distribution table 80A) may comprise medium capacity (e.g., 600 gigabytes), medium performance (15,000 revolutions per minute) hard disk drives.

The storage devices storing data in a RAID 1 configuration with two mirrors (i.e., storage devices 50(1,4), 50(2,4), 50(3,4) and 50(4,4), as shown in disk distribution table 80C) may comprise high performance, low capacity (e.g., 200 gigabytes) solid state drives.

Typically, there is a direct relationship between performance and a cost per gigabyte (i.e., higher performance storage devices have a higher cost per gigabyte). Therefore, module 36 can be configured so that:

The high capacity, low performance storage devices 50 in the RAID 6 6+2 configuration shown in disk distribution table 80B may store data that is updated infrequently, since writing first data to a given storage device 50 in a RAID 6 6+2 configuration comprises reading second data from five of the storage devices, calculating, using the first and the second data, two parity computations, and writing the first data and the two parity computations to corresponding regions on three of the storage devices.

The medium capacity, medium performance storage devices 50 in the RAID 6 2+2 configuration shown in disk distribution table 80A may store data that is updated more frequently, since writing first data to a given storage device 50 in a RAID 6 2+2 configuration comprises reading second data from 1 of the storage devices, calculating, using the first and the second data, two parity computations, and writing the first data and the two parity computations to corresponding regions on three of the storage devices.

The low capacity, high performance storage devices 50 in the RAID 1 configuration with two mirrors shown in disk distribution table 80C may store the most frequently updated data, since writing data to a given storage device 50 in a RAID 1 configuration with two mirrors comprises writing the data to corresponding regions on three of the storage devices (i.e., a primary and two mirrors). Writing data to storage devices 50 in a RAID 1 configuration is typically faster than writing data to storage devices 50 in a RAID 6 configuration, since the steps of reading data and calculating parity computations are not performed.

As shown in the Figures, for a given slice 60 (i.e., a given SMU), the master scheduler, the backup scheduler(s), the primary storage device and the secondary storage device(s) can be distributed among different modules 36 of storage system 20. Additionally, each module 36 may store any number (including zero) of master and backup schedulers 72.

Figure 3C:
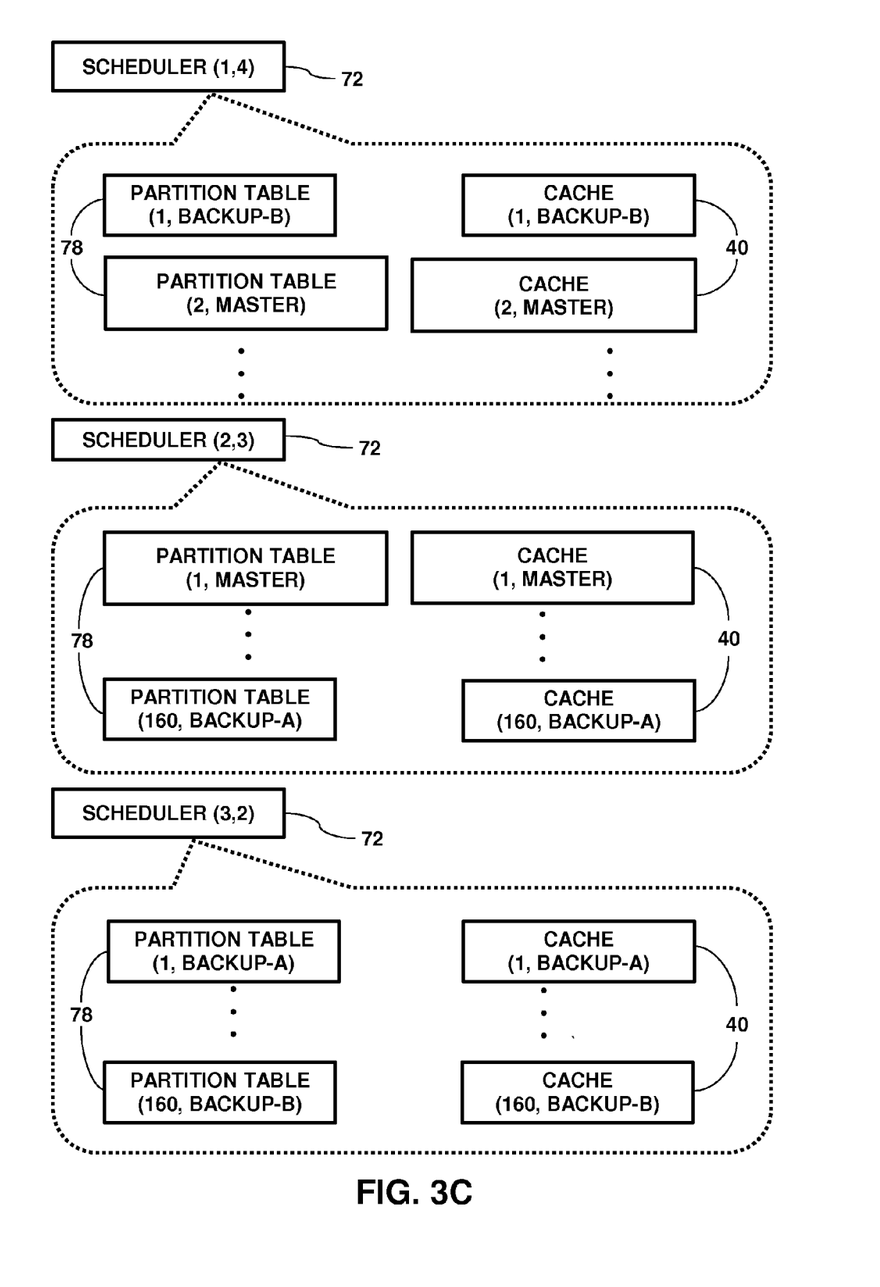

FIG. 3C is a block diagram that schematically illustrates schedulers 72(1,4), 72(2,3) and 72(3,2) in accordance with an embodiment of the present invention. Each scheduler 72 comprises pairs of partition tables 78 and caches 40, wherein each of the pairs is associated with a given slice 60. Each entry in a given partition table 78 corresponds to a partition (i.e., a region) on a given storage device 50, and comprises a data structure (e.g., an array) that enables processor 62 to map a given volume number and logical address to the partition. Operation of caches 40 is described in FIG. 1, hereinabove.

As described supra, each scheduler 72 can be associated with a given slice 60 and can function as either a master scheduler or a backup scheduler for the given slice. In the example shown in FIGS. 3B-3C, each slice 60 has a master scheduler 72 ("MASTER") and two backup schedulers 72 ("BACKUP-A" and "BACKUP-B"). Likewise, each partition table 78 may be referenced by an ordered pair (D, E), where D is a number representing a given slice 60, and E describes a role of a given partition table 78, and each cache 40 may be referenced by an ordered pair (D, F), where D is defined above, and F describes a role of a given cache 40. In embodiments described herein each slice 60 has a master cache 40 and two backup caches 40 (i.e., BACKUP-A and BACKUP-B).

Continuing the example described supra, the schedulers shown in FIG. 3C comprise the schedulers associated with slice 60(1). As shown in the Figure, scheduler 72(2,3) comprises partition table 78(1, MASTER) and cache 40(1, MASTER), scheduler 72(3,2) comprises partition table 78(1, BACKUP-A) and cache 40(1, BACKUP-A), and scheduler 72(1,4) comprises partition table 78(1, BACKUP-B) and cache 40(1, BACKUP-B).

In embodiments described herein, processor 62 can map an I/O request to a given scheduler 72, as opposed to mapping the I/O request to a given module 36 or a given storage device 50. By mapping I/O requests to schedulers 72, embodiments of the present convention "decouple" partition tables 78 from storage devices 50. In other words, upon receiving an I/O request, interface node 66 may convey the I/O request to a first module 36 executing a given scheduler 72 comprising a given partition table 78, wherein the given partition table references a given storage device 50 coupled to a second module 36.

Figure 3D:
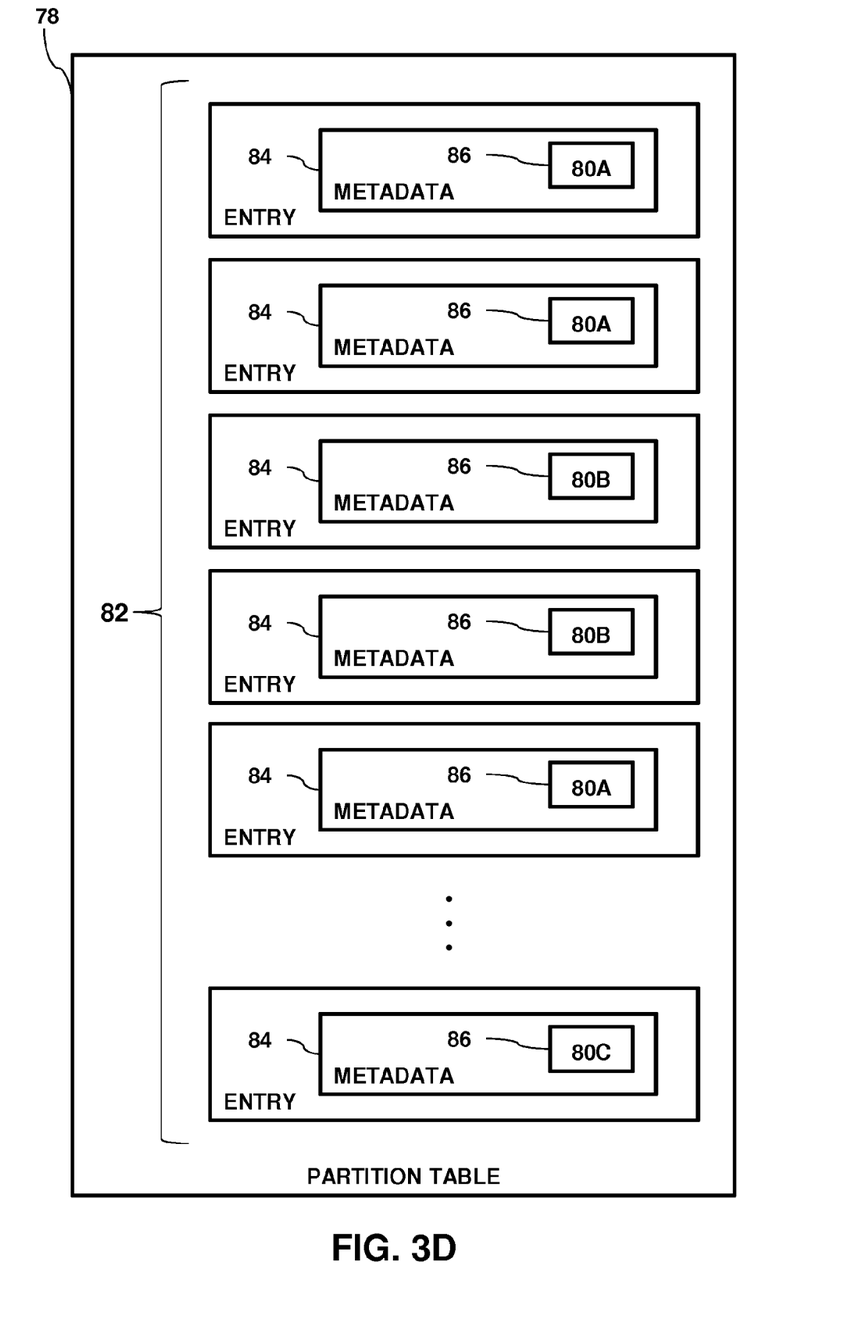

FIG. 3D is a block diagram that schematically illustrates entries 82 in partition table 78, in accordance with an embodiment of the present invention. Each entry 82 in the partition table comprises metadata 84 that enables a given scheduler 72 to process I/O requests from host computers 22. In embodiments of the present invention, metadata 84 for a given partition table entry 82 comprises an identifier 86 that references a given disk distribution table 80 for data referenced by the given partition table entry. Additionally, for each partition table entry 82, metadata 84 may include additional information such as a volume number, a starting logical address and a timestamp.

In the example shown in FIG. 3D, partition table 78 includes partition table entries 82 referencing data stored in a RAID 6 2+2 configuration (i.e., where identifier 86 references partition table 80A), partition table entries 82 referencing data stored in a RAID 6 6+2 configuration (i.e., where identifier 86 references partition table 80B), and partition table entries 82 referencing data stored in a RAID 1 configuration with two mirrors (i.e., where identifier 86 references partition table 80C).

While the configuration shown in FIGS. 2 and 3 describe embodiments of the present invention managing data in slices 60, other storage management units (e.g., volumes and storage pools) are considered to be within the spirit and scope of the present invention.

In operation, a given scheduler 72 may change a RAID configuration for a given partition table entry 82 from an initial RAID configuration to a subsequent RAID configuration by modifying identifier 86 for the given partition table entry. Upon modifying the identifier, the given scheduler can migrate data from storage devices 50 in the initial RAID configuration to the storage devices in the subsequent RAID configuration.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Controlling Data Placement

Figure 4:
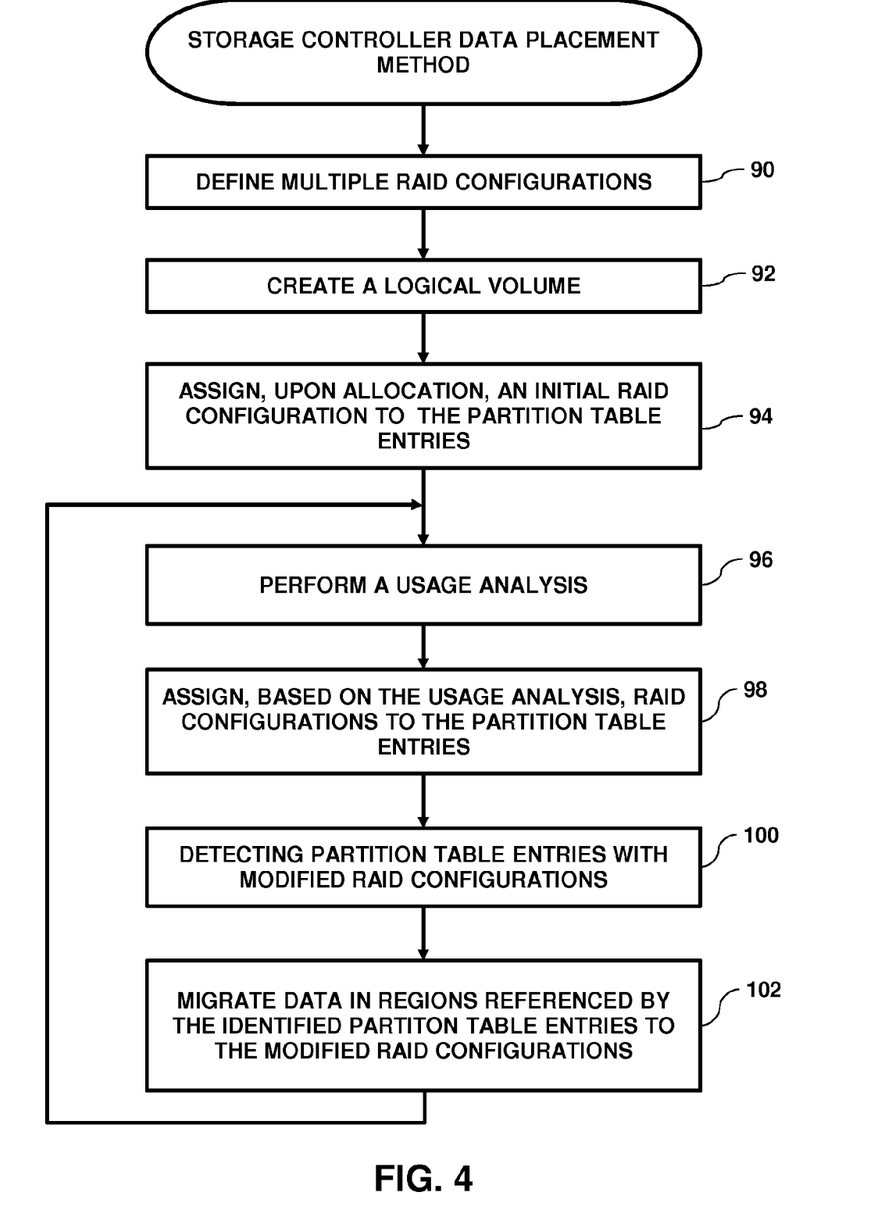
FIG. 4 is a flow diagram that schematically illustrates a method of data placement, in accordance with an embodiment of the present invention.

FIG. 4 is a flow diagram that schematically illustrates a method of controlling data placement in a given slice 60, in accordance with an embodiment of the present invention. In a definition step 90, a systems administrator (not shown) defines disk distribution tables 80 referencing multiple RAID configurations, and in a creation step 82, processor 62 creates a logical volume in response to a request received from a given host computer 22. As described supra, the logical volume may comprise multiple slices 60 on storage devices 50, with each slice 60 having an associated partition table 78.

In an initialization step 94, upon allocating each entry 82 (i.e., in partition tables 78 for slices 60), processor 62 assigns an initial RAID configuration to the allocated entry. For example, processor 62 may initially assign "80B" to identifier 86 to each of the entries in the partition table. Therefore, in the configuration shown in FIG. 3, module 36 may initially store data to the created volume in a RAID 6 6+2 configuration on high capacity, low performance storage devices.

In an analysis step 96, processor 62 may perform, at a time subsequent to the initialization step, a usage analysis on a given partition table 78 for a given slice 60. The usage analysis can rank each entry in the given partition table by determining how often data (i.e., on storage devices 50) referenced by each partition table entry 82 is accessed over a specific time period.

In an assign step 98, processor 62 assigns, based on the usage analysis, one of disk distribution tables 80 to identifier 86 of each partition table entry 82. A goal of the usage analysis may be to identify an optimal RAID configuration for each slice that minimizes processing time for I/O requests while accounting for the cost of the RAID configurations (i.e., based on the number and the type of storage devices in the RAID configurations). For example, processor 62 may assign a first distribution table 80 (referencing a first RAID configuration) to a first entry 82, and a second distribution table 80 (referencing a second RAID configuration) that is independent (i.e., different) from the first distribution table to a second entry 82.

As described supra, the usage analysis may assign the disk distribution tables to the partition table entries based on how often data referenced by the partition tables entries is accessed. For example, using the configuration shown in FIG. 3, the usage analysis may assign disk distribution tables 80 to partition table entries 82 so that 80% of the partition table entries have identifier 86 referencing partition table 80B (i.e., the RAID 6 6+2 configuration having the least expensive cost per gigabyte), 15% of the partition table entries have identifier 86 referencing partition table 80A (i.e., the RAID 6 2+2 configuration), and 5% of the partition table entries have identifier 86 referencing partition table 80C (i.e., the RAID 1 with two mirrors configuration having the highest cost per gigabyte).

In some embodiments processor 62 may assign one of disk distribution tables 80 to identifier 86 of each partition table entry 82 in response to an input received from the systems administrator. For example, while defining a volume, the systems administrator can configure the volume so that all slices of the volume are stored in the RAID 6 2+2 configuration shown in disk distribution table 80A.

In a detect step 100, processor 62 detects any entries 92 whose identifier 86 was modified (i.e., from an initial RAID configuration to a subsequent RAID configuration) either by the usage analysis or by the system administrator. Finally, in a migration step 102, processor 62 migrates, for each detected partition table entry, data from the initial RAID configuration to the subsequent RAID configuration, and the method continues with step 96.

Continuing the example described supra in step 98, if identifier 86 in the first partition table entry was initially "80A" (i.e., RAID 6 2+2) prior to the usage analysis in step 96, and processor 62 modified the identifier by assigning "80C" (i.e., RAID 1 with two mirrors) to the identifier of the first partition table entry in step 98, then in step 102, processor 62 migrates data referenced by the first partition table entry from storage devices 50(2,3) and 50(3,3) to storage device 50(2,4), and mirrors the referenced data to storage devices 50(3,4) and 50(4,4).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    defining, in a storage system comprising multiple storage devices, multiple redundant array of independent disks (RAID) configurations for data stored on the storage devices;
    assigning, to a first entry in a partition table having multiple entries, a first one of the multiple RAID configurations; and
    assigning, to a second entry in the partition table, a second one of the multiple RAID configurations that is independent from the first one of the multiple RAID configurations;

wherein assigning the first one of the multiple RAID configurations to the first entry in the partition table comprises modifying an existing RAID configuration for the first entry, and comprising migrating the data referenced by the existing RAID configuration to the modified RAID configuration.

2. The method according to claim 1, and comprising performing a usage analysis on the partition table, and identifying, based on the analysis, one of the multiple RAID configurations for each of the entries in the partition table.

3. The method according to claim 2, wherein the first one of the multiple RAID configurations comprises the identified one of the RAID configurations for the first entry, and the second one of the multiple RAID configurations comprises the identified one of the RAID configurations for the second entry.

4. The method according to claim 1, wherein each of the multiple RAID configurations is selected from a list comprising storage device types and RAID levels.

5. A storage system, comprising:
multiple storage devices; and
a processor configured to define multiple redundant array of independent disks (RAID) configurations for data stored on the storage devices, to assign, to a first entry in a partition table having multiple entries, a first one of the multiple RAID configurations, and to assign, to a second entry in the partition table, a second one of the multiple RAID configurations that is independent from the first one of the multiple RAID configurations;
wherein the processor is configured to assign the first one of the multiple RAID configurations to the first entry in the partition table by modifying an existing RAID configuration for the first entry, and wherein the processor is configured to migrate the data referenced by the existing RAID configuration to the modified RAID configuration.

6. The storage system according to claim 5, wherein the processor is configured to perform usage analysis on the partition table, and to identify, based on the analysis, one of the multiple RAID configurations for each of the entries in the partition table.

7. The storage system according to claim 6, wherein the first one of the multiple RAID configurations comprises the identified one of the RAID configurations for the first entry, and the second one of the multiple RAID configurations comprises the identified one of the RAID configurations for the second entry.

8. The storage system according to claim 5, wherein the processor is configured to select each of the multiple RAID configurations from a list comprising storage device types and RAID levels.

9. A computer program product, the computer program product comprising:
a non-transitory computer readable storage medium having computer readable program code embodied therewith, the computer readable program code comprising:
computer readable program code configured to define, in a storage system comprising multiple storage devices, multiple redundant array of independent disks (RAID) configurations for data stored on the storage devices;
computer readable program code configured to assign, to a first entry in a partition table having multiple entries, a first one of the multiple RAID configurations; and
computer readable program code configured to assign, to a second entry in the partition table, a second one of the multiple RAID configurations that is independent from the first one of the multiple RAID configurations;
wherein the computer readable program code configured to assign the first one of the multiple RAID configurations to the first entry in the partition table by modifying an existing RAID configuration for the first entry, and comprising computer readable program code configured to migrate the data referenced by the existing RAID configuration to the modified RAID configuration.

10. The computer program product according to claim 9, and comprising computer readable program code configured to perform in a usage analysis on the partition table, and computer readable program code configured to identify, based on the analysis, one of the multiple RAID configurations for each of the entries in the partition table.

11. The computer program product according to claim 10, wherein the first one of the multiple RAID configurations comprises the identified one of the RAID configurations for the first entry, and the second one of the multiple RAID configurations comprises the identified one of the RAID configurations for the second entry.

12. The computer program product according to claim 9, wherein the computer readable program code is configured to select each of the multiple RAID configurations from a list comprising storage device types and RAID levels.

\* \* \* \* \*